(12) United States Patent
Walters et al.

(10) Patent No.: US 8,139,924 B2
(45) Date of Patent: Mar. 20, 2012

(54) SYSTEM AND METHOD FOR DIGITAL CONTENT RETRIEVAL

(75) Inventors: Eric Walters, Phoenix, AZ (US); Richard Lang, Sebastopol, CA (US)

(73) Assignee: TiVo Inc., Alviso, CA (US)

( * ) Notice: Subject to any disclaimer, the term of this patent is extended or adjusted under 35 U.S.C. 154(b) by 1606 days.

(21) Appl. No.: 11/483,139

(22) Filed: Jul. 7, 2006

(65) Prior Publication Data

US 2007/0009235 A1  Jan. 11, 2007

Related U.S. Application Data

(60) Provisional application No. 60/697,525, filed on Jul. 7, 2005.

(51) Int. Cl.
*H04N 5/917* (2006.01)
*H04N 5/76* (2006.01)
*H04N 5/445* (2006.01)
*H04N 7/16* (2006.01)
*H04N 7/167* (2006.01)
*H04N 7/173* (2006.01)

(52) U.S. Cl. .............. 386/328; 386/293; 725/8; 725/31; 725/58; 725/86; 725/94; 725/102; 725/105; 725/109; 725/110; 725/112; 725/135

(58) Field of Classification Search .................. 386/112, 386/E5.001, E5.003, E5.043, 83; 348/E5.103, 348/E5.105, E7.031, E7.063, E7.071, E7.073, 348/E7.061; 725/31, 86, 88, 94, 105, 109, 725/110, 112, 8, 58, 102, 135
See application file for complete search history.

(56) References Cited

U.S. PATENT DOCUMENTS

| | | | |
|---|---|---|---|
| 4,313,135 A | 1/1982 | Cooper | |
| 4,506,358 A | 3/1985 | Montgomery | |
| 4,602,297 A | 7/1986 | Reese | |
| 4,665,431 A | 5/1987 | Cooper | |
| 4,752,834 A | 6/1988 | Koombes | |
| 4,760,442 A | 7/1988 | O'Connell et al. | |
| 4,761,684 A | 8/1988 | Clark et al. | |
| 4,789,961 A | 12/1988 | Tindall | |
| 4,794,465 A | 12/1988 | Van Luyt et al. | |

(Continued)

FOREIGN PATENT DOCUMENTS

EP  0 594 241  4/1994

(Continued)

OTHER PUBLICATIONS

U.S. Appl. No. 09/073,452, Lang et al.
Shen et al., "A Fast Algorithm for Video Parsing Using MPEG Compressed Sequences," IEEE 1995.
Smollar et al., "Content-Based Video Indexing and Retrieval," IEEE 1994.
Meng et al., "CVEPS—A Compressed Video Editing and Parsing System," ACM Multimedia 1996.

(Continued)

*Primary Examiner* — Thai Tran
*Assistant Examiner* — Syed Hasan
(74) *Attorney, Agent, or Firm* — Sterne, Kessler, Goldstein & Fox, P.L.L.C.

(57) ABSTRACT

Flexibility with respect to access and enjoyment of time shifted content in a content distribution network is provided, especially with regard to content not present on a DVR. A DVR accesses a network storage device over a network for particular portions of content not available on the DVR and the network storage device provides those missing portions. The user may then rewind and playback not only already locally stored content but also that content provided by the storage device. Content can be provided through faster-than-real-time transmissions such that the content is made available to the DVR prior to it being needed for rewind functionality or playback.

33 Claims, 6 Drawing Sheets

U.S. PATENT DOCUMENTS

| | | | |
|---|---|---|---|
| 4,816,905 A | 3/1989 | Tweedy et al. |
| 4,821,121 A | 4/1989 | Beaulier |
| 4,833,710 A | 5/1989 | Hirashima |
| 4,862,269 A | 8/1989 | Sonoda et al. |
| 4,897,867 A | 1/1990 | Foster et al. |
| 4,920,533 A | 4/1990 | Dufresne et al. |
| 4,924,387 A | 5/1990 | Jeppesen |
| 4,949,169 A | 8/1990 | Lumelsky et al. |
| 4,949,187 A | 8/1990 | Cohen |
| 4,963,995 A | 10/1990 | Lang |
| 4,965,662 A | 10/1990 | Shiota |
| 4,975,771 A | 12/1990 | Kassatly |
| RE33,535 E | 2/1991 | Cooper |
| 5,014,125 A | 5/1991 | Pocock et al. |
| 5,018,186 A | 5/1991 | Kimura et al. |
| 5,019,900 A | 5/1991 | Clark et al. |
| 5,027,400 A | 6/1991 | Baji et al. |
| 5,057,932 A | 10/1991 | Lang |
| 5,099,319 A | 3/1992 | Esch et al. |
| 5,103,467 A | 4/1992 | Bedlek et al. |
| 5,130,792 A | 7/1992 | Tindell et al. |
| 5,132,992 A | 7/1992 | Yurt et al. |
| 5,134,499 A | 7/1992 | Sata et al. |
| 5,168,353 A | 12/1992 | Walker et al. |
| 5,181,114 A | 1/1993 | Richards et al. |
| 5,191,431 A | 3/1993 | Hasegawa et al. |
| 5,202,761 A | 4/1993 | Cooper |
| 5,247,348 A | 9/1993 | Israelsen et al. |
| 5,283,639 A | 2/1994 | Esch et al. |
| 5,371,532 A | 12/1994 | Gelman et al. |
| 5,371,551 A | 12/1994 | Logan et al. |
| 5,414,455 A | 5/1995 | Hooper et al. |
| 5,438,423 A | 8/1995 | Lynch et al. |
| 5,440,334 A | 8/1995 | Walters et al. |
| 5,442,390 A | 8/1995 | Hooper et al. |
| 5,455,684 A | 10/1995 | Fujinami et al. |
| 5,488,409 A | 1/1996 | Yuen et al. |
| 5,508,733 A | 4/1996 | Kassatly |
| 5,541,738 A | 7/1996 | Mankovitz |
| 5,550,594 A | 8/1996 | Cooper et al. |
| 5,572,261 A | 11/1996 | Cooper |
| 5,577,190 A | 11/1996 | Peters |
| 5,614,940 A | 3/1997 | Cobbley et al. |
| 5,675,388 A | 10/1997 | Cooper |
| 5,696,868 A | 12/1997 | Kim et al. |
| 5,706,388 A | 1/1998 | Isaka |
| 5,710,970 A | 1/1998 | Walters et al. |
| 5,715,356 A | 2/1998 | Hirayama et al. |
| 5,719,982 A | 2/1998 | Kawamura et al. |
| 5,721,815 A | 2/1998 | Ottesen et al. |
| 5,724,474 A | 3/1998 | Oguro et al. |
| 5,729,280 A | 3/1998 | Inoue et al. |
| 5,737,009 A | 4/1998 | Payton |
| 5,742,347 A | 4/1998 | Kandlur et al. |
| 5,774,186 A | 6/1998 | Brodsky et al. |
| 5,787,225 A | 7/1998 | Honjo |
| 5,815,194 A | 9/1998 | Ueda |
| 5,889,915 A | 3/1999 | Hewton |
| 5,899,578 A | 5/1999 | Yanagihara et al. |
| 5,920,842 A | 7/1999 | Cooper et al. |
| 5,937,138 A | 8/1999 | Fukuda et al. |
| 5,949,948 A | 9/1999 | Krause et al. |
| 5,963,202 A | 10/1999 | Polish |
| 5,982,748 A | 11/1999 | Yin et al. |
| 5,991,496 A | 11/1999 | Kojitma |
| 5,995,488 A | 11/1999 | Kalkunte et al. |
| 6,005,564 A | 12/1999 | Ahmad et al. |
| 6,018,612 A | 1/2000 | Thomason et al. |
| 6,028,599 A | 2/2000 | Yuen et al. |
| 6,047,328 A | 4/2000 | Charny et al. |
| 6,052,384 A | 4/2000 | Huang et al. |
| RE36,801 E | 8/2000 | Logan et al. |
| 6,125,396 A | 9/2000 | Lowe |
| 6,167,083 A | 12/2000 | Sporer et al. |
| 6,169,843 B1 | 1/2001 | Lenihan et al. |
| 6,192,029 B1 | 2/2001 | Averbuch et al. |
| 6,226,447 B1 | 5/2001 | Sasaki et al. |
| 6,240,103 B1 | 5/2001 | Schoenblum et al. |
| 6,295,294 B1 | 9/2001 | Odlyzko |
| 6,304,714 B1 | 10/2001 | Krause et al. |
| 6,331,986 B1 | 12/2001 | Mitra et al. |
| 6,400,686 B1 | 6/2002 | Ghanwani et al. |
| 6,493,317 B1 | 12/2002 | Ma |
| 6,493,878 B1 | 12/2002 | Kassatly |
| 6,498,894 B2 | 12/2002 | Ito et al. |
| 6,588,015 B1 | 7/2003 | Eyer et al. |
| 6,597,662 B1 | 7/2003 | Kumar et al. |
| 6,647,419 B1 | 11/2003 | Mogul |
| 6,760,538 B1 | 7/2004 | Bumgardner et al. |
| 6,788,882 B1 | 9/2004 | Geer et al. |
| 6,850,965 B2 | 2/2005 | Allen |
| 7,055,169 B2 | 5/2006 | Delpuch et al. |
| 7,073,189 B2 | 7/2006 | McElhatten et al. |
| 7,080,400 B1 | 7/2006 | Navar |
| 7,149,415 B2 | 12/2006 | Thiagarajan et al. |
| 2002/0021889 A1 | 2/2002 | Hayakawa et al. |
| 2002/0191954 A1 | 12/2002 | Beach et al. |
| 2003/0016664 A1 | 1/2003 | MeLampy et al. |
| 2003/0072327 A1 | 4/2003 | Fodor et al. |
| 2003/0105918 A1 | 6/2003 | Plourde, Jr. |
| 2003/0106064 A1 | 6/2003 | Plourde, Jr. |
| 2003/0131252 A1 | 7/2003 | Barton |
| 2003/0154128 A1 | 8/2003 | Liga et al. |
| 2003/0208763 A1 | 11/2003 | McElhatten |
| 2003/0219228 A1* | 11/2003 | Thiagarajan et al. ........... 386/83 |
| 2004/0013409 A1 | 1/2004 | Beach et al. |
| 2004/0078829 A1 | 4/2004 | Patel et al. |
| 2004/0143845 A1* | 7/2004 | Lin et al. ......................... 725/58 |
| 2005/0025469 A1 | 2/2005 | Geer et al. |
| 2005/0086696 A1* | 4/2005 | Daniels .......................... 725/88 |
| 2005/0114911 A1 | 5/2005 | Hesselink et al. |
| 2005/0120377 A1 | 6/2005 | Carlucci et al. |
| 2006/0037037 A1 | 2/2006 | Miranz |
| 2006/0095472 A1 | 5/2006 | Krikorian et al. |
| 2006/0112344 A1 | 5/2006 | Ducheneaut et al. |

FOREIGN PATENT DOCUMENTS

| | | |
|---|---|---|
| EP | 0 726 574 | 8/1996 |
| EP | 0 785 675 | 1/1997 |
| EP | 0 762 756 | 3/1997 |
| GB | 2 222 742 | 8/1989 |
| JP | 2003 244598 | 8/2003 |
| JP | 2005 260818 | 9/2005 |
| WO | WO 91/03112 | 8/1990 |
| WO | WO 96/33579 | 10/1996 |
| WO | WO 97/04584 | 2/1997 |
| WO | WO 97/04585 | 2/1997 |
| WO | WO 99/37045 | 7/1999 |

OTHER PUBLICATIONS

Entropic Communications, "Enabling Home Networking for Digital Entertainment," IEEE Presentation, Mar. 2005.

Kasenna, Inc., "Deploying Network-Based PVR Services," Sep. 2004.

TIVO, Inc., "TIVO Installation Guide, Series 2 Digital Video Recorder," 2002.

European Patent Office. Supplementary European Search Report. European Application No. 06 78 6830.7-2223. Name of Applicant: TiVo Inc. International Application No. PCT/US2006/026801. Jul. 2, 2010. 12 pages.

Turcan, Eduard et al. Share it! By bringing P2P into the TV-domain. Proceedings of the Third International Conference on Peer-to-Peer Computing (P2P'03). The Computer Society. 2003 IEEE. 2 pages.

Turcan, Eduard et al. Share it! By bringing P2P into the TV-domain. Department of Computer and Information Science. Philips Research Laboratories, Redhill, England. p. 1-2.

Rein Inger, D.J., Bandwidth renegotiation for VBR video over ATM networks, Selected Areas in Communications, IEEE Journal, vol. 14, Issue 6, pp. 1076-1086, (Aug. 6, 1996).

European Patent Office. European Office Communication dated Apr. 26, 2011. European Application No. 06 786 830.7-2223. Name of Applicant: TiVo Inc. English Language. 7 pages.

* cited by examiner

SYSTEM AND METHOD FOR DIGITAL CONTENT RETRIEVAL

CROSS-REFERENCE TO RELATED APPLICATIONS

The present application claims the priority benefit of U.S. provisional patent application No. 60/697,525 filed Jul. 7, 2005 and entitled "DVR Video Catch Up Function." The disclosure of this commonly owned application is incorporated herein by reference.

The present application is related to U.S. patent application Ser. No. 09/073,452 filed May 6, 1998 and entitled "System and Method for Time Shifted Program Viewing." The disclosure of this commonly owned application is incorporated herein by reference.

The present application is also related to U.S. Pat. No. 6,850,965 for a "Method for Connection Acceptance and Rapid Determination of Optimal Multi-Media Content Delivery Over a Network" and U.S. Pat. No. 5,963,202 for a "System and Method for Distributing and Managing Digital Video Information in a Video Distribution Network," which issued on Feb. 1, 2005 and Oct. 5, 1999, respectively. The disclosure of these commonly owned patents are also incorporated herein by reference.

BACKGROUND OF THE INVENTION

1. Field of the Invention

The present invention relates, generally, to the field of digital content storage and playback and, more particularly, to the retrieval of stored or cached digital content from a network storage device for playback at a local client device.

2. Description of the Related Art

The time shifting of television content has significantly changed how and when people view television. Through time shifting, content is recorded to a particular storage medium for viewing at a later time. Time shifting was originally accomplished through the use of video cassette recorders (VCRs). A tuner in a VCR would receive a signal corresponding to particular television content over the public airwaves and record the constituent audio and visual signals of that program on magnetic tape. A user, through the VCR, could subsequently convert the recorded audio and video signals into a composite signal for display by a television connected to the VCR regardless of when the television content was originally transmitted and recorded.

In addition to time shifting, the VCR also allowed for a user to fast forward and rewind through recorded content (sometimes referred to as seeking or VCR functionality). For example, the user of a VCR could fast forward through commercials. Similarly, the user could rewind to particular portions of a movie that were of interest or had inadvertently been missed (e.g., the user was interrupted from watching a time shifted movie to answer a telephone call).

Notwithstanding the aforementioned benefits of the VCR, a number of drawbacks were associated with the time shifting of television content. For example, VCRs required the use of inconvenient magnetic tapes for recording television content. If a user wanted to fast forward or rewind through a particular piece of content or to a particular portion of content recorded on the tape, proper seeking typically required the user to: (1) stop playback of the cassette tape, (2) activate a fast forward or rewind function, (3) stop the particular seek function when the user arrived at the appropriate portion of the tape, and (4) reinitiate playback of the content from the newly arrived at portion of the cassette tape.

This process in and of itself was clumsy and inconvenient and presupposed the user knew exactly where to stop the cassette tape to arrive at the portion of the content for which playback was desired. In most cases, however, a user would simply activate the appropriate seek function while playback occurred. While seeking in such a fashion conveniently allowed the user to visually search through the recorded content, this behavior was not ideally suited to the magnetic tape and often resulted in damage to the tape and sometimes the VCR. In some instances, the combination of general wear and tear on the recording medium and improper seeking caused the content recorded on the magnetic tape to become wholly unwatchable.

With the advent of the Digital Video Recorder (DVR), however, users could now accomplish with digital computer memory what was previously accomplished through the use of magnetic video tape but without the aforementioned drawbacks. For example, through the use of data compression technologies such as those developed by the Motion Pictures Experts Group (MPEG, which also refers to the format developed by that group for files containing moving pictures), content like that broadcast on cable and free-television is recorded to digital storage media such as a disk drive or solid-state memory. Additionally, the user can play previously-recorded material at any time and perform a visual seek without worrying about damaging the recorded content.

Through the use of the DVR, the user can cache or record current incoming content transmissions while watching an earlier portion of the same, which was not possible with a VCR. With a VCR, the time shifted playback of content was only possible once recording of the content had ceased. But through the use of the DVR, a user can arrive home to view television content at 8:15 pm yet rewind and watch portions of that content from the memory of the DVR (e.g., the portion of the content that began at 8:00 pm). During the time that the user is watching the earlier cached or recorded portion (i.e., 8:00 pm to 8:15 pm) of the content from DVR memory, the current content transmission continues to be cached or recorded from 8:15 pm until the content transmission ends, this latter portion subsequently being available for user playback as well.

Notwithstanding this additional benefit of the DVR over the VCR, this particular type of time shifting is generally limited to caching or recording on the particular channel to which the DVR (or a television) is presently tuned. DVRs are generally unable to time shift across multiple channels while changing channels in real-time because doing so would require multiple tuners capable of storing to multiple storage devices or segments of memory simultaneously. Such an approach would be cost-prohibitive because there are a large number of channels available for the caching or recording of content (e.g., over-the-air free-TV broadcasts, satellite, cable, and so on).

Another problem with presently available DVRs is that the DVR only caches current content from the channel to which it (or an associated television) is currently tuned. Thus any time that the user changes the channel, the DVR's temporary memory is flushed and only the content that arrives on the new channel from that point forward (i.e., after the channel change) is cached by the DVR. In other words, if a DVR user chooses a new channel at 8:20 pm, only content from 8:20 onward is cached. While it is possible (subject to the presence of data in memory of the DVR that is digitally representative of the television content) to rewind back to the 8:20 start time of the cached content, it is impossible to rewind back to the actual start time of the content (in this example, 8:00 pm)

because that portion of the content was not cached at the DVR prior to the 8:20 pm channel change.

A similar problem exists with regard to the semi-permanent recording of content by the DVR, which differs from temporary caching and is discussed further herein. For example, a user may configure their DVR to record a two-hour content selection beginning at 8:00 pm. If the user attempts to change the channel during that two-hour recording window (e.g., at 8:20 pm), the DVR will terminate the recording operation and change the channel, possibly following a warning to and receipt of confirmation from the user concerning termination of the recording. In this instance, the DVR will have an incomplete recording of content that spans only from 8:00 pm to 8:20 pm and an equally incomplete cache of content from the new channel as the DVR was not engaged in recording or caching content from that particular channel prior to the changing of the channel.

SUMMARY OF THE INVENTION

In one exemplary embodiment of the present invention, a system for content retrieval is provided. The exemplary system includes a content transmission source, a server receiving a transmission from the transmission source, and a digital video recorder communicatively coupled to both the transmission source and the server. The digital video recorder may receive and record a portion of content transmitted from the transmission source and request missing portions of that transmitted content from the server. Those transmissions from the server to the digital video recorder may occur in faster-than-real-time.

An exemplary method for retrieval of content from a network storage device is also disclosed. Through this method, content cached at a digital video recorder may be rewound. The digital video recorder, during the course of rewinding content, may determine additional content should be acquired from the network storage device if the rewind of content is to continue. The digital video recorder, following delivery of a request for additional content to the network storage device, may then receive that additional content and continue rewinding through the same. The content delivered by the networked storage device may be transmitted in faster-than-real-time.

In a further exemplary embodiment, a method is provided for retrieval of network cached content. This exemplary method includes identifying a temporal range of program-specific content in a cache of a digital video recorder and, further, identifying a range of program-specific content missing from the cache of the digital video recorder. The digital video recorder then sends a request for this range of missing content to a storage device. The missing content may subsequently be delivered in faster-than-real-time to the digital video recorder.

An exemplary digital video recorder is also disclosed, the recorder comprising an input port for the receipt of content from a content source. The recorder also includes a storage device and a controller device to control the manipulation of content in the storage device. A catch-up engine in the digital video recorder provides for the request of one or more portions of content to be delivered to the recorder via a network data interface. The catch-up engine of the digital video recorder may also provide client status information and client configuration information. The digital video recorder may also include an analog-to-digital converter to allow for the digitization of received analog content; the converter may be an integrated part of the input port of the recorder.

The present disclosure also provides for an exemplary networked storage device that includes an input port for receiving content from a content source, a storage device for the storage of that content, and a controller device to control access to the stored content. The storage device is configured to process digital video recorder requests for content stored by the storage device and an output port for transmission of the digital video recorder requested content. The requested content may be transmitted in faster-than-real-time.

DETAILED DESCRIPTION

Figure 1:
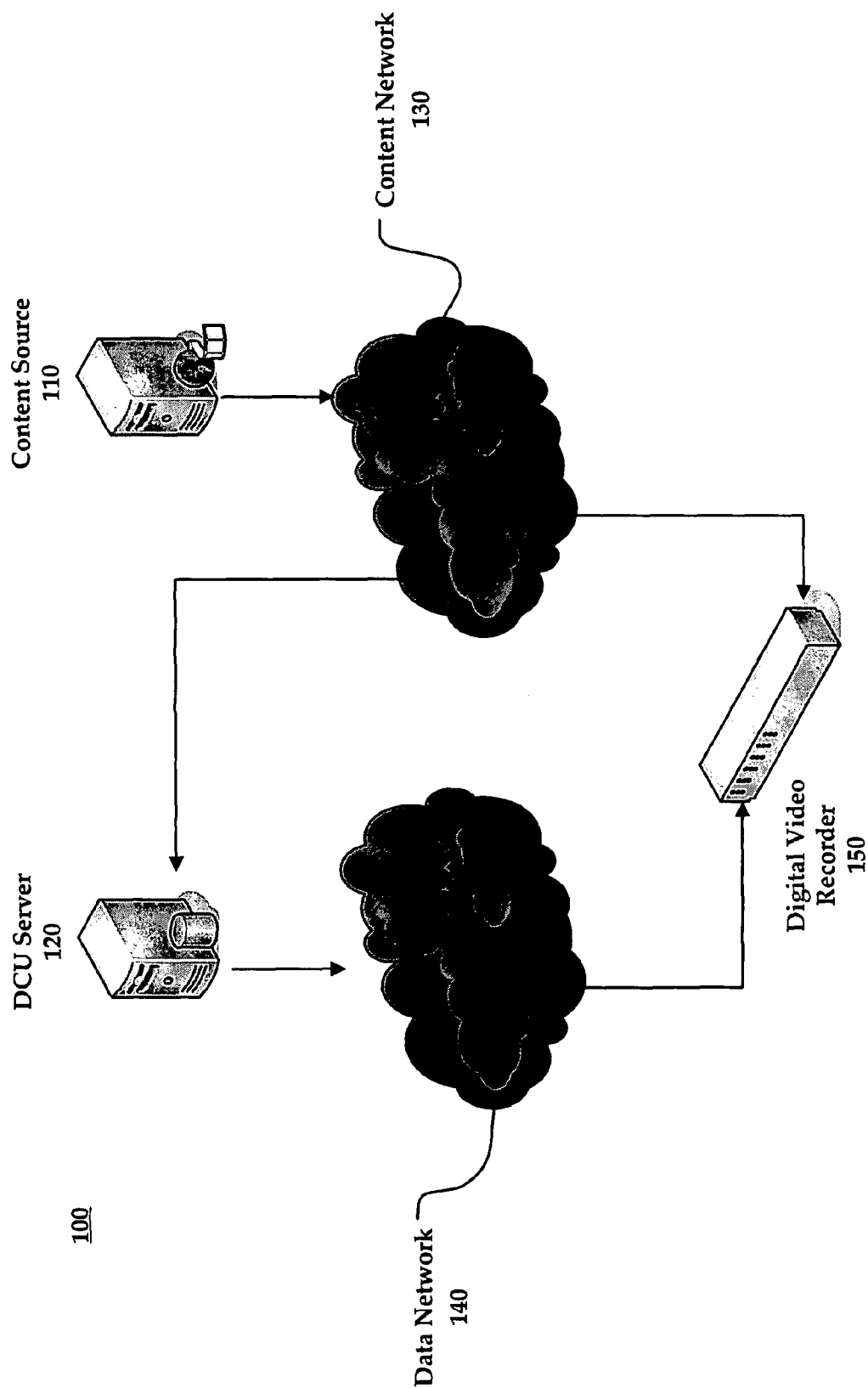
FIG. 1 illustrates a system architecture for digital content retrieval including a Digital Catch-Up (DCU) server and a digital catch-up enabled DVR with a data network interface as may be implemented in an exemplary embodiment of the present invention.

Various embodiments of the present invention provide a DVR user with the ability to obtain missing portions of content for playback via their DVR. That content may be obtained at faster-than-real-time rates. For example, a DVR user may have turned on their television one hour past the start time of a movie on broadcast television (e.g., a user may tune in at 9:00 pm to a movie that began at 8:00 pm). This particular movie may be two hours in length (i.e., it is broadcast from 8:00 pm to 10:00 pm). The user's DVR may have only cached the thirty minutes of the movie immediately prior to when the user turned on their television (e.g., from 8:30 pm to 8:59 pm). Thus, any portion of the movie broadcast prior to the previous thirty minutes (e.g., from 8:00 pm to 8:29 pm) is not available on the DVR.

The presently disclosed digital catch-up enabled DVR will provide for the acquisition of the first thirty minutes of the broadcast movie (i.e., from 8:00 pm to 8:29 pm) from a DCU server that has access to the missing portions of the movie, the DCU server having been recording the entire movie from its 8:00 pm start time. Those missing portions of the movie (i.e., 8:00 pm to 8:29 pm) are then provided to the user's DVR by the DCU server via a transmission, which may be a faster-than-real-time transmission, over a data network. Following this transmission, the first 30 minutes of the movie (i.e., 8:00 pm to 8:29 pm) are now available at the DVR for playback in addition to the portion of the movie that was already cached as a part of the movie's regular broadcast (the thirty minutes immediately prior to the user tuning in—8:30 pm to 8:59 pm) and that may continue to be recorded (the remainder of the movie, from 9:00 pm to 10:00 pm) as a part of the aforementioned regular broadcast. In this way, the DVR may be able to "catch-up" to a current content transmission (i.e., the content currently being transmitted) via the receipt of catch-up content from the DCU server, the catch-up content being that portion of content acquired via the DCU server and that is not presently available at the DVR. That portion of catch-up content may be transmitted to the DVR in faster-than-real-time.

An embodiment of the aforementioned catch-up enabled DVR may determine that a particular portion of content is unavailable at the DVR through the course of a rewind operation or through a direct request for catch-up content initiated by the user. The catch-up enabled DVR may acquire the unavailable portions of the content from a DCU server via a catch-up request transmitted to the DCU server by the DVR. The catch-up request may identify various informational aspects concerning the requested content including title of the content, portion of the content requested, desired format of the content, bit rate of the content, digital rights management (DRM) information, and other information and/or DVR operational capabilities as they pertain to receipt of the content from the DCU server. The DCU server may then transmit the requested portions of content to the requesting DVR in accordance with some or all of the aforementioned transmission requirements. The transmission may occur in faster-than-real-time whereby the catch-up content requested by the DVR is available for playback by the DVR before playback actually begins.

An embodiment of the DVR, which is capable of processing video, audio, and/or a combination of the two, includes an input port for the receipt of, for example, content broadcast over a content network. The DVR also includes a data network interface through which the DVR may request and receive catch-up content from the DCU server, the catch-up content being transmitted over a data network. The data network interface may also allow for the exchange of content amongst a series of DVRs (e.g., DVR-to-DVR transmissions of content). The aforementioned DVR further includes a storage device (or devices) for the caching of content as may be received via the input port, the storage of recorded content originally received via the input port, and the caching and/or recording of catch-up content or originally transmitted content as provided by the DCU server and as received through the data network interface. The DVR may also provide information to the DCU server concerning the current status or general configuration of the DVR.

An embodiment of the DCU server is generally configured in a similar fashion as the DVR in that the DCU server may store content transmitted by the content source (e.g., broadcast television). The DCU server is also configured to receive catch-up requests from one or more DVRs, which may occur simultaneously. In response to these catch-up requests, the DCU server transmits to the DVRs requested portions of content that are otherwise unavailable at the requesting DVRs. The requested content may not have been recorded by the DVR or may have been flushed from DVR memory to make room for new content being received via an input port. The DCU server provides the requested portions of content such that DVR users may playback the received catch-up content as if it was originally available at the DVR. The DCU server, in some embodiments, may also provide original transmissions of content whereby the DCU server functions as a content source. In some instances, the DCU server may be another DVR.

In the course of the present disclosure, the reference to 'live' broadcasts or transmission of content does not mean to limit the nature of the content to being truly live in nature. These examples also refer to pre-recorded content that is being transmitted or broadcast in real-time. Further, references to rewinding in the context of a DVR are not meant to imply a physical winding of film or other physical media but rather the frame-by-frame, second-by-second, chapter-by-chapter, song-by-song, or other temporally measured review/seeking functionality generally associated with such an operation in the context of, for example, a VCR, a Digital Versatile Disk (DVD) player, or a Compact Disc (CD) player.

Cached content generally refers to content that is temporarily stored in an available memory device such as a hard drive. For example, content may be received as part of a broadcast transmission. The memory device of the DVR may have allocated resources for the storage of digital data that equates to thirty-minutes of content for playback. Cached content is typically flushed from a memory device in accordance with the first-in-first-out (FIFO) principle and/or upon a DVR being instructed to begin caching content from a new broadcast transmission on a different transmission channel.

Recorded content generally refers to content that is semi-permanently stored in an available memory device such as a hard drive. For example, a user may identify a particular content selection (e.g., a movie) to be recorded from its beginning to its end. This content may be saved in the DVR memory device until it is affirmatively removed (e.g., deleted) by the user. Recorded content will generally not be flushed from memory as a result of the receipt of new content and the aforementioned FIFO principle or the mere changing of a channel as is the case with temporarily cached content. Cached content may be converted into recorded content whereby the memory device of a DVR provides for semi-permanent retention of the cached data instead of ultimately flushing it from memory as is the case with regularly cached content and as described above.

Catch-up content generally refers to that content that is presently unavailable at a user's DVR and is thus retrieved from a DCU server in accordance with several embodiments of the present invention. Catch-up content may represent a general portion of unavailable content (e.g., the first 30 minutes of a movie), a specific range of content as may be temporally designated (e.g., that content broadcast from 10:32 pm to 10:36 pm), and/or through some other measurement (e.g., a content counter (0001-0005) as exemplified in the context of a VCR cassette tape or a specific range of sequential frame numbers).

Catch-up content may, in some embodiments of the present invention, overlap with certain portions of content already available at a DVR making a catch-up request. For example, a DCU server may provide additional bookends of content with respect to the requested content whereby an additional amount of content is provided at the beginning and/or the end of the requested catch-up content despite a particular portion of content having been requested by the DVR. Catch-up content made available at a DVR in response to a catch-up request may be stored as cached content or recorded content. Catch-up content may also be temporarily stored as cached content that is subsequently converted into and semi-permanently stored as recorded content. This conversion may depend on, for example, the particular status and/or capabilities of the DVR receiving the catch-up content (e.g., available memory to record the content).

FIG. 1 illustrates a system architecture 100 according to an exemplary embodiment of the present invention. Through the exemplary system architecture 100 of FIG. 1, a user's DVR may receive portions of content (e.g., a movie) from a content source and request missing portions of that content from a DCU server 120 that has those portions of the content. System architecture 100 may include a content source 110, DCU server 120 and a digital catch-up enabled DVR 150. DVR 150 may be configured to receive content from the content source 110 and the DCU server 120 over data network 140 and/or through content network 130, both of which may comprise a variety of transmission mediums and/or mechanisms as is discussed below.

Content source 110 may be any source of content. For example, content may be representative of that content traditionally found on free television stations (e.g., Ultra High Frequency (UHF) and Very High Frequency (VHF) channels). Accordingly, a television station transmitting National Television Systems Committee (NTSC) standard analog signals may be content source 110. Content may also be representative of premium content such as that found on a variety of particularized cable networks (e.g., Home Box Office (HBO), Entertainment and Sports Programming Network (ESPN), the SciFi Channel, and Music Television (MTV)). In one example, the cable provider responsible for delivering that content (e.g., Comcast) may be the content source 110.

Content may also be representative of feature films (e.g., movies) as may be provided by a particular film distributor. Content may also include audio-only content such as music, news, or talk as may be heard over free radio (e.g., Amplitude Modulation (AM) and Frequency Modulation (FM)) or satellite radio (e.g., Sirius and XM Radio). The providers of this particular content (i.e., feature film or audio) may be considered a content source 110 as may a provider of digital or satellite television. Content may be provided in a digital or in an analog format, which may be subsequently converted to a digital format Delivery of content from content source 110 (e.g., a television station transmitting NTSC analog signals) differs from the creation and development of content (e.g., conceptualizing, script writing, filming, editing, and so forth). The task of content delivery may be assigned to a particular entity that is distinct from the content creator and that specializes in such delivery services. In some instances, however, the content creator and the content source 110 may be the same entity. For example, local television stations may produce local news or regional-interest content for delivery over their transmission network to local television viewers. Similarly, many radio stations (both terrestrial and satellite) produce their content on-site (e.g., a live morning radio show) and transmit the same over their respective network for receipt by various listeners or subscribers. As such, content source 110 may be an entity tasked solely with the delivery of content or an entity possessing both the means to develop and deliver content.

Content may be delivered to recipients (e.g., viewers, listeners, subscribers, and so forth) via content network 130. Content network 130 may comprise a variety of communications mediums, some of which may be particular to the nature of the content source 110. In the case of free television, the content network 130 may comprise the broadcast area wherein a particular NTSC content transmission may be received. The extent or reach of the content network 130 may be subject to various transmission parameters of the content source 110 such as antenna configuration or transmission power. In the case of satellite radio, the content network 130 may be that area that is accessible to a particular satellite transmission via a satellite receiver possessed by a subscriber. The content network 130 with regard to cable television may comprise a head-end office that relays content to various cable descrambler or set-top box units over a network of coaxial or RF cable.

Content network 130 should not be construed as being limited to only broadcast transmissions. Content may be broadcast, unicast, or multicast depending on, for example, the particular communication apparatus at the content source 110, the end-user, and any intermediate parties. Further, the content network 130 should not be construed as being exclusive to a point-to-point network wherein content is delivered from source to destination with no intermediary entities. In some embodiments of the present invention, various relay stations, intermediate servers, or other communication networks may be utilized to deliver content from the content source 110 to the end user. In that regard, content network 130 may comprise a series of smaller communications, broadcast, or transmission networks that allow for the delivery of content from one point in the network to another point whereby the overall size of the content network 130 may be expanded (e.g., mesh networks).

The content network 130 and data network 140 may overlap in varying degrees. For example, certain content may be transmitted over content network 130 but that particular portion of the content network 130 network may also be a part of data network 140. For example, in the case of Internet radio multicast or an Internet video broadcast, an Internet Protocol (IP) network may constitute a portion of the content network 130 as described above. The IP network that makes up content network 130 with respect to this particular content source 110 may also be a part of data network 140. Content network 130 and data network 140 may also be wholly exclusive of one another (i.e., no shared links or mediums) or be one-in-the-same (e.g., as may be the case with Internet video and audio).

DCU server 120 may be implemented to function as an upstream DVR that records current content transmissions for one or more channels or provides access to a library of the same. The DCU server 120 may make that content available to a requesting DVR 150 having a data network interface via a data network 140 (as described further herein). By providing upstream DVR functionality and access to content, DVR 150 may catch-up to certain content not available at the DVR 150.

As DCU server 120 may function as the aforementioned upstream DVR, the DCU server 120 may comprise several of the hardware and/or software implementations discussed with respect to DVR 150 in the context of FIG. 2 to the extent those implementations may be used to capture, store, and subsequently deliver content. This may include the hardware and/or software to implement various compression and digitization functionalities to the extent these operations are performed at the DCU server 120. The DCU server 120 may further comprise additional input and output ports as are more particularized to, for example, a network caching server device such as an Ethernet port adapter (e.g., an NC7782 dual port Local Area Network on Motherboard (LOM)) and associated drivers as may be used for engaging in various data exchanges over data network 140.

DCU server 120 may be any computing device coupled to data network 140 and, in some instances, content network 130. DCU server 120 is configured for the storage of content as may originate from content source 110. For example, as content is delivered from content source 110 over the content network 130, a receiving antenna, tuner, or other apparatus such as a satellite dish or satellite radio receiver may receive the content source 110 transmission signal. The particular apparatus.(not shown) performing the receipt of the transmission signal may be an independent apparatus coupled to the DCU server 120 or may be integrated with the same. For example, the receiving apparatus may be part of a studio facility that is also housing the DCU server 120. Alternatively, the apparatus receiving the content may be physically remote from the DCU server 120 whereby the content received by the particular apparatus is transmitted over some communications medium to the DCU server 120 or other intermediate entities for storage and/or manipulation (e.g., editing).

In some embodiments of the present invention, especially those involving a transmission of analog content, some conversion of the received transmission signal may occur. In these instances, analog content may be digitized by appropriate analog-to-digital conversion hardware and/or software prior to storage by DCU server 120 or its associated content storage facilities. The analog-to-digital conversion hardware and/or software may be coupled directly to the DCU server 120 to allow for automated conversion and storage of content as it is received at the server 120.

Alternatively, conversion may be performed at another computing device (e.g., a dedicated conversion workstation) (not shown) and coupled to the DCU server 120 prior to the digital data being stored by DCU server 120. This workstation may be part of the aforementioned studio facility or, again, physically remote from the DCU server 120. Conversion of the received content may take place with some manual involvement whereby audio or video engineers utilize various editing and production techniques and tools to improve the quality of the converted content. Once received at the DCU server 120, the content is stored in a digital format until, for example, it is requested by an end-user client device such as DVR 150.

Content may also be compressed utilizing a wide variety of compression techniques (e.g., MPEG) prior to storage by DCU server 120. Compression of the content not only preserves storage space but helps to facilitate delivery of content in faster-than-real-time transmissions as discussed herein. Compression, like the aforementioned conversion process, may be automated or involve some manual interaction.

DVR 150 may make a catch-up request of the DCU server 120 upon determining that the DVR 150 lacks a particular portion of content. The catch-up request is not limited to any particular command, format, or data structure. In that regard, the request may be any data transmission to DCU server 120 or a designated intermediary computing device that indicates the particular content selection for which catch-up content is requested (e.g., a movie title), the address to which the content (or portion thereof) should be delivered (e.g., an IP address of the DVR), and a temporal portion of the requested content (e.g., 8:10 am to 8:30 am). More or less information may be a part of the catch-up request. This information may be included in a single catch-up request or in a series of data transmissions from the DVR 150 to the DCU server 120 that are collectively referred to as the catch-up request.

In some embodiments, the catch-up request may trigger an acknowledgment from the DCU server 120 for receipt by the DVR 150. The receipt of the acknowledgment by the DVR 150 ensures the catch-up request is received by the DCU server 120. If the DVR 150 does not receive an acknowledgment within a predetermined period of time, the DVR 150 may retransmit the catch-up request to ensure eventual receipt of catch-up content.

Through this catch-up request, a user who has tuned-in to a particular broadcast of content after the start of the broadcast may retrieve a portion of the content that was not locally stored (e.g., cached or recorded). Following the receipt of a catch-up request, the DCU server 120 may deliver the requested content-the catch-up content-over data network 140 to the DVR 150 via a real-time or faster-than-real-time transmission of content.

Reference to the faster-than-real-time transmission of content generally refers to the transmission of content with a temporal characteristic (e.g., a movie) wherein the transmission of the content occurs at a rate faster than the real-time playback of that content (e.g., 60 seconds of content are delivered in 30 seconds). Faster-than-real-time transmission may be achieved, for example, through the transmission of content at a rate higher than the content's encoded bit rate. Various means and methodologies for compressing and transmitting content in excess of its encoded bit rate are known in the art.

A faster-than-real-time transmission of content may be, in some instances, a single stream of content. For example, the transmission may be a generally steady stream of content delivered to an end-user in faster-than-real-time. Additionally, a faster-than-real-time transmission may also encompass multiple transmissions of content. For example, a faster-than-real-time transmission may encompass regular or irregular intermittent transmissions of content rather than the aforementioned generally continuous stream. Information related to a faster-than-real-time transmission of content may appear in the context of a catch-up request in addition to client status and client configuration information, all of which may be provided to a DCU server 120 by DVR 150.

Upon receipt of a catch-up request, the DCU server 120 retrieves the requested portion or portions of content, addresses that content for delivery to the requesting DCU server 120, and transmits the addressed content to the DVR 150. The transmission may occur in one or more faster-than-real-time transmissions of content. Through the receipt of these faster-than-real-time transmissions, the DVR 150 now has access to missing portions of content corresponding to, for example, the currently tuned channel or previously recorded—albeit incomplete—content. These faster-than-real-time transmissions of content may be stored in, for example, a hard drive at the DVR 150 before the content is needed for playback.

DCU server 120, in some embodiments, may automatically delete the entirety of stored content from its memory after a current content transmission is finished by content source 110 (e.g., the end of a broadcast). Stored content may also be selectively deleted (e.g., in response to a request by an individual tasked with server management or as part of a regularly-scheduled memory maintenance routine). By periodically deleting content stored by the DCU server 120, the DCU server 120 frees its own storage resources for the storage of a next content transmission.

Alternatively, the DCU server 120 may not delete the content but instead record the content. The DCU server 120 may then make the content available for 'on-demand' delivery to DVRs or other set-top box devices with certain storage and requesting capabilities that may be used to permit the delivery of content in either real-time or faster-than-real-time. For example, a particular content transmission may be re-broadcast by content source 110 several times over the course of several days. The DCU server 120 may record the content on its first broadcast-cycle for the purposes of subsequent catch-up functionality. This avoids the need to individually re-record each of the repeated broadcasts of the content over the course of the next several days when the content is re-broadcast.

In yet another embodiment, the DCU server 120 may comprise or have access to a library of content. For example, if it is known that particular content will be in high-demand when it broadcasts, the DCU server 120 may be provided with the content in advance for storage and later retrieval. By providing this content in advance, the DCU server 120 may focus on the task of catch-up distribution rather than the myriad tasks of receipt, storage, and catch-up distribution. Through this library functionality, the DCU server 120 may also provide on-demand functions as described above.

The DCU server 120 may be implemented in a cyclic broadcasting architecture such as that described in U.S. Pat. Nos. 5,710,970 and 5,440,334 for a "Broadcast Video Burst Transmission Cyclic Distribution Apparatus and Method," the disclosures of which are incorporated herein by reference. In such an implementation, the catch-up functionality offered by the DCU server 120 and a DVR 150 may allow for a user to retrieve particular portions of content if the user misses the initial portion of the broadcast cycle.

DCU server 120 may be configured to provide catch-up functionality on all or a select number of transmission channels. Particular channel selection may be based on, for example, a studio or channel dedicated DCU server 120. For example, the DCU server 120 may provide catch-up functionality for all HBO or Showtime transmissions. In that regard, DCU server 120 may be controlled by or affiliated with the content source 110 or the owner of the content. In this way, the copyright owner of the content may have a greater degree of control over the content being transmitted by content source 110 and stored at the DCU server 120.

Similarly, the DCU server 120 may be dedicated to particular content from particular producers such as a particular movie studio or distributor. DCU server 120 may also be implemented by particular Internet Service Providers (ISPs) or television service providers. DCU server 120 may also be regional with respect to particular content (e.g., Fox Sports Bay Area). Catch-up servers like DCU server 120, too, may in some embodiments only store that content that has been designated as eligible for storage and catch-up distribution. This eligibility may be indicated by information embedded in a transmission header or transmission sideband of content by, for example, the producer, owner, distributor, or creator of the content.

The DCU server 120 may further comprise certain network optimization functionality. For example, the DCU server 120 may determine how much catch-up content is sent to a requesting DVR and when that content is sent according to certain transmission requirements designated by the catch-up request from the DVR 150. A number of these network optimization functionalities are disclosed in U.S. Pat. No. 6,850, 965, which has been incorporated herein by reference, and may be embodied in a network optimization engine (not shown).

For example, the network optimization engine may prescribe a control variable, which represents a target flow rate of content from the DCU server 120 to DVR 150. The optimization engine may then determine a variety of time-varying constraints (control variables) on the flow rate of the content. A cost function of the control variable for each DVR 150 may then be determined; this function corresponding to a maximized value of the control variables. Bandwidth may then be prescribed to each DVR 150 requesting catch-up content from the DCU server 120 based upon the value of the control variable maximized by the cost function to achieve optimal allocation of bandwidth between the DCU server 120 and one or more DVRs 150.

Another example of a network optimization scheme may include the use of content encoded at various bit rates or formats. For example, a DVR 150 may be playing back content at a particular bit rate (e.g., 5 Mbps) and/or in a particular format. The DCU server 120 may deliver requested catch-up content at a different and sometimes lesser bit rate (e.g., 1.5 Mbps) and/or format such that the transmission of the catch-up content occupies less bandwidth than would a transmission of content encoded or in a format identical to the present playback of content at the DVR 150. The use of a lesser bit rate may be useful when network conditions between the DCU server 120 and DVR 150 (e.g., high user traffic on the data network 140) are causing transmission difficulties or delays with higher bit rate content. The two varying file bit rates portions of content (i.e., the content transmitted by DCU server 120 and the content already stored at DVR 150) may be played back at the DVR 150 without interruption notwithstanding the differing formats or bit rates. In some embodiments, the content may be encoded at a variable bit-rate that may be adjusted during the transmission of the catch-up content by DCU server 120 to DVR 150.

In some instances, the system architecture 100 may comprise a series of DCU servers 120. This series of DCU servers 120 may store content for subsequent delivery in a variety of formats and/or at a variety of bit rates. That is, a series of distributed DCU servers 120 may be individually tasked with storage and delivery of catch-up content according to a particular format and/or bit-rate. The system architecture 100 may also comprise a master server (not shown) that is tasked with assigning particular transmission responsibilities to particular DCU servers 120 at particular times in accordance with particular content format settings, and so forth to ensure proper load balancing of a series of DCU servers 120.

Stored catch-up content may also be distributed amongst a plurality of DCU servers 120 in a peer-to-peer configuration. Thus, various DCU servers 120 may provide only particular content or portions of particular content (e.g., a first DCU server 120 may comprise the first 20 minutes of a particular content transmission while a second DCU server 120 may comprise the next 20 minutes, and so forth). The peer-to-peer DCU server 120 network may also comprise a master server as described above.

Data network 140 may comprise various communications facilities and mediums (e.g., telephony, wireless, satellite, cable, optic, and so forth) as may be provided by telecommunications companies and ISPs. Data network 140 may be a geographically widespread network (e.g., a Wide Area Network (WAN)), like the Internet that may depend upon a variety of the aforementioned communications facilities to link various network segments. A WAN may comprise a series of smaller linked communications networks such as Local Area Networks (LANs). Data network 140 may also be or include a LAN. A LAN is typically comprised of a group of computers and other devices dispersed over a relatively limited area and connected by, for example, a variety of broadband communications links. LANs may take on a variety of configurations including server client, peer-to-peer, peer groups, or a combination of the same.

Figure 2:
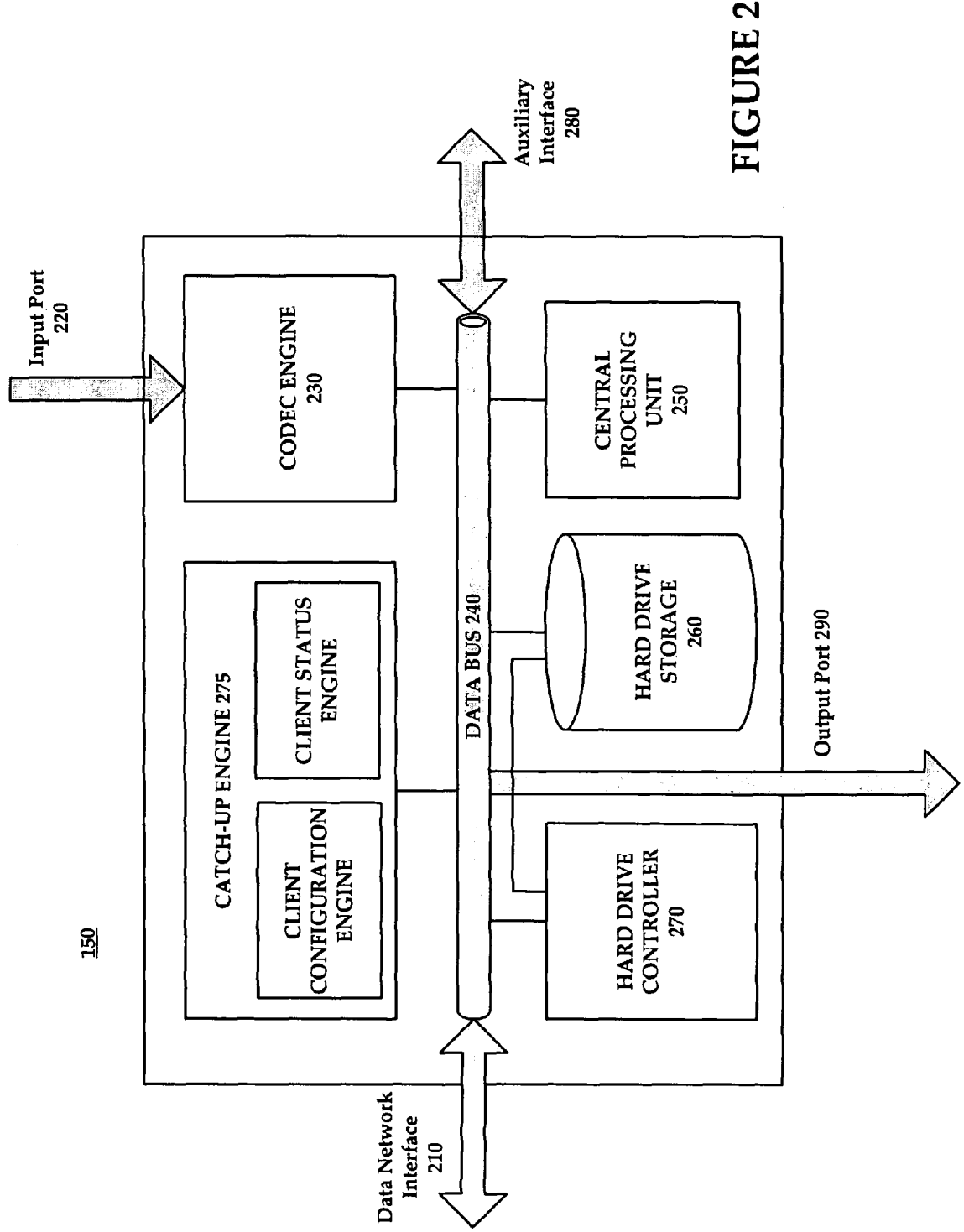
FIG. 2 illustrates an exemplary DVR with a data network interface as may be implemented in, for example, the system architecture of FIG. 1.

FIG. 2 illustrates an exemplary catch-up enabled DVR 150 as may be implemented in an embodiment of the present invention. Through the exemplary catch-up enabled DVR 150 of FIG. 2, a user may receive and store content from a content source 110. The DVR 150 may also identify missing portions of content from the content source 110 and generate a catch-up request that is delivered to a DCU server 120. In response to the catch-up request, the DCU server 120 transmits the requested content to the DVR 150, which may then receive and store the catch-up content in local storage (e.g., a hard drive) as if the catch-up content had been received as part of the original content transmission from the content source 110, which may occur as a real-time transmission of content.

DVR 150 includes a data network interface 210, which may be a Transmission Control Protocol/Internet Protocol (TCP/IP) interface that provides certain data communication functionality. Through data network interface 210, DVR 150 may send and receive information utilizing, for example, the TCP/IP protocol over a variety of networks such as the Internet or local area/home networks. These data exchanges may occur, for example, between DVR 150 and a DCU server 120 or between a series of DVRs. Various other communication protocols may be used with respect to DVR 150 via data network interface 210 such as the Uniform Datagram Protocol (UDP).

Data network interface 210 should not be construed to be solely limited to TCP/IP communications as a variety of various protocol exchanges may take place through data network interface 210. In addition to content received from DCU server 120 via data network interface 210, the data network interface 210 also functions as a general communications interface for delivering catch-up requests for particular catch-up content to a DCU server 120 or an intermediary task server (e.g., a master server).

DVR 150 may further comprise input port 220. Input port 220 may comprise a coaxial RF connector such as an F connector for use with cable television, satellite television, or cable modems. Various other connectors and/or electronics may be implemented in the context of or in addition to input port 220 such that the DVR 150 may receive television, satellite, cable, and other digital and analog transmissions (e.g., satellite radio). As such, DVR 150 may comprise one or more input ports 220 to allow for the simultaneous receipt of more than one content transmission from a series of content sources 110. DVR 150 may also comprise a separate RJ-11 connector (not shown) and coupled to a MODEM (not shown) to allow for certain data exchanges over a conventional telephone network. These exchanges may include software upgrades for the DVR 150 and content scheduling information. Exchanges that take place via a MODEM and RJ-11 connector (or similar interface device) may, in some embodiments, alternatively take place via data network interface 210. Further, the RJ-11 connector may in some embodiments be the data network interface 210.

Input port 220 is coupled to Compression/Decompression (CODEC) engine 230. CODEC engine 230 may be implemented in software, hardware, or a combination of both for the purpose of compression of incoming content transmissions. In one exemplary embodiment, CODEC engine 230 may comprise an MPEG-2 encoder/decoder chip.

Any reference to an engine in the present specification refers, generally, to a program (or group of programs) that perform a particular function or series of functions that may be related to functions executed by other programs (e.g., the engine may perform a particular function in response to another program or may cause another program to execute its own function). Engines may be implemented in software or hardware as in the context of an appropriate hardware device such as an algorithm embedded in a processor or application-specific integrated circuit.

In some embodiments of the present invention, CODEC engine 230 may also comprise analog-to-digital conversion functionality such that an incoming analog television signal (e.g., NTSC, Phase Alternating Line (PAL), and Sequential Couleur a Memoire (SECAM)) may be converted into a digital format prior to being compressed and stored by the DVR 150. DVR 150 may, however, also comprise an independent analog-to-digital (and vice versa) converter. In still further embodiments, input port 220 may itself be integrated with certain compression/decompression and/or digitization functionality such that frame grabbing, quantization, and/or compression occur before a transmission from a content source is introduced to the DVR 150 thereby reducing processing loads on a CPU 250. CODEC engine 230 may vary a compression scheme to increase effective capacity of a storage device (such as hard drive storage device 260) by reducing the resolution, color quality, and/or image size of received content. These variations may be automatically implemented by CODEC engine 230 as may be entailed by certain conditions of the DVR 150 or in response to a user setting.

Input port 220 may also receive content from a content source 110 in a non-analog format such as is used for digital cable, satellite, or high-definition television. The input port 220 may receive a transmission of binary MPEG-2 data transmitted by the content source 110 whereby additional quantization and compression may not be implemented. Digital content may still pass through CODEC engine 230 but without any action by the CODEC engine 230 (as shown in FIG. 2) or bypass (not shown) CODEC engine-230 and go directly to data bus 240.

In some instances such as satellite transmissions, the transmission signal may be encrypted to prevent piracy. In these instances, the digital transmission may first pass through a satellite or cable set-top box that decrypts the incoming signal. The set-top box with such decryption functionality may be integrated with the DVR 150. DVR 150 may also comprise a card slot (not shown) or other interface device for introducing a decryption card to the DVR 150 and to allow for decryption operation or functionality.

Content received via input port 220, CODEC engine 230, and/or data network interface 210 is coupled to data bus 240. Through data bus 240, a CPU 250 may control the transfer of data and instructions throughout the DVR 150. A wide variety of data buses as are known in the art may be used in the implementation and operation of data bus 240.

CPU 250 is a programmable logic device that performs the instruction, logic, and mathematical processing for DVR 150. In one exemplary embodiment, the CPU 250 controls CODEC engine 230 in addition to a hard drive controller 270 and hard drive storage 260 in DVR 150. CPU 250 may be coupled to random access memory (RAM) (not shown) for working storage space.

Hard drive storage 260 is the memory device of DVR 150 tasked with the storage (both recording and caching) of incoming content from input port 220 and/or data network interface 210. Content may be temporarily stored (i.e., cached) in hard drive storage 260 in accordance with a FIFO configuration for a current content transmission (e.g., a television broadcast). In such an example, the area of hard drive storage 260 dedicated or allocated for current content storage may be limited to a maximum of 30 minutes of content. The amount of dedicated or allocated current content storage may be implemented by the DVR manufacturer or in response to a user configuration. Content may also be semi-permanently stored (i.e., recorded) subject to user deletion to allow for archiving of content.

Other types of storage devices as are known in the art (e.g., flash memory, rewritable CD (CD-RW), rewritable DVD (DVD-RW)) may be used in place of hard drive storage 260. Additional storage mechanisms may also be added through the use of auxiliary interface 280.

In one exemplary embodiment, hard drive storage 260 stores (caches) both current content transmissions (i.e., content that is presently being received via input port 220 or data network interface 210) and also semi-permanently stores (records) content. Hard drive storage 260 may also be responsible for storing (caching and/or recording) catch-up content received via data network interface 210. The amount of hard drive storage 260 dedicated to storing any type of content (caching current content versus recording current content versus caching and/or recording catch-up content) may be controlled by the hard drive controller 270. The particular amount of storage 260 for each type of content may be subject to a setting by the manufacturer of the DVR 150 and/or adjustable by the user.

Note that FIG. 2 illustrates a single hard drive storage device 260 tasked with the storage of all types of received content—cached and recorded, current and catch-up —for the simplicity of illustration and discussion. In some embodiments, however, multiple storage devices may be utilized. For example, a current content transmission may be stored (cached) in a possibly smaller and more limited storage device. Content designated to be recorded may be stored in another possibly larger device. Catch-up content may be stored in yet another dedicated storage device.

Notwithstanding the fact that hard drive storage 260 may be receiving currently transmitted content from content source 110 and/or catch-up content from DCU server 120, hard drive controller 270 may be configured to maintain distinctions between each type of content and its particular storage locale in hard drive storage 260. Hard drive controller 270 may also provide for the seamless reading between the various content classifications at the instruction of CPU 250, which responds to user requests for particular content. Alternatively, the hard drive controller 270 may provide for the pre-pending and re-storage of received catch-up content to cached and/or recorded content already present at the DVR 150 such that two sets of content can be concatenated together as a single data file rather than read from two different file locales in hard drive storage 260.

Hard drive controller 270 may operate in conjunction with CPU 250 to control the presentation and access to content both locally and over a network. For example, a user may issue a rewind command to the DVR 150 via a remote control or some other interface. The command may be communicated to CPU 250 via an input interface engine (not shown) that operates in conjunction with various input mechanisms (e.g., InfraRed remote controller) to accept user input and translate the same into a machine-readable instruction for execution by the appropriate hardware and/or software elements of DVR 150.

In some embodiments, retrieval of and/or access to content as may occur in the context of the presently disclosed catch-up enabled DVR 150 may alternatively be implemented in other devices such as a personal computer (PC) or a portable media device. In such an embodiment, certain commands may be issued through a graphic user interface that is manipulated either through a computer keyboard, a mouse, or other input device (e.g., voice commands received via a Universal Serial Bus (USB) headset or microphone). The retrieval of and/or access to content as described with respect to the aforementioned catch-up enabled DVR 150 may also occur in the context of, for example, mobile devices such as cellular phones, Personal Digital Assistants (PDAs), or tablet PCs. Any type of interface (e.g., cell phone keypad, stylus and touch screen, rotatable wheeled interface) may be used such that the computing device retrieving the content understands the user's intent to, for example, rewind through content presently stored on the device or otherwise accessible via a network and DCU server 120.

The CPU 250, in response to the rewind command, may cause the hard drive controller 270 to begin seeking through content stored in hard drive storage 260. Appropriate action may be taken in response to other commands such as fast forward, pause, record, and the like in that hard drive controller 270 accesses the appropriate portion of the hard drive storage 260 for the appropriate content or portions thereof. The appropriate content (or portions thereof), in the case of a play command, may be extracted from the hard drive device 270, communicated over data bus 240 and decompressed as needed by CODEC engine 230 prior to the content being played back on an appropriate device (e.g., a television in the case of video content or speaker system in the case of audio content) via output port 290.

Depending on the nature of the issued user command (e.g., transmission of content to another DVR over a local area network or transfer of content to an auxiliary storage unit), the data may not be decompressed such that it does not occupy excessive transmission bandwidth or unnecessarily occupy a large amount of storage space. In the former example, and subject to appropriate transmission bandwidth, DVR-to-DVR transmissions may occur in faster-than-real-time.

The hard drive controller 270 may also interoperate with the catch-up engine 275 regarding the status of stored content. For example, hard drive controller 270 may determine how much content is present (e.g., 10 seconds, 30 minutes, and so forth) in hard drive storage 260—albeit in a digital data format corresponding to the content—with respect to a present rewind command and whether access to catch-up content from a DCU server 120 should occur. For example, if the remaining cached content falls below a threshold indicator as described herein, then the DVR 150 may transmit a catch-up request to a DCU server 120 via catch-up engine 275. Hard drive controller 270, in response to content having met or fallen below the threshold indicator, may inform CPU 250 of the impending content shortage situation. As a result, the CPU 250 may cause a catch-up request to be sent to DCU server 120 via data network interface 210 with particular client configuration and/or status information as may be generated by catch-up engine 275.

Catch-up engine 275 may embody a number of client status and client configuration elements, some of which are described in commonly owned U.S. Pat. No. 5,963,202, the disclosure of which has been incorporated herein by reference. This information may be processed by DCU server 120 or an intermediary computing device coupled to the same. This processing may include the identification of stored content or portions thereof to be provided to a DVR 150 making a catch-up request of the DCU server 120.

Catch-up engine 275 may comprise a series of subsidiary engines such as a client configuration engine. Through the client configuration engine of catch-up engine 275, DCU server 120 may be provided client configuration data related to the DVR 150. Examples of client configuration data include processing power of the DVR 150, generally available storage in hard drive storage 260 of the DVR 150 (or an auxiliary storage device coupled to DVR 200 via auxiliary interface 280), compression and decompression capabilities, network bandwidth information, addressing information for the DVR 150, user account information, billing information, DCU server 120 access permissions, and the like.

With this information, the DCU server 120 may ensure that the delivered content is in a particular encoding (or encryption) format such that the DVR 150 can process the same. The DCU server 120 may also obtain information related to addressing of catch-up content and whether a particular DVR 150 is authorized to access the DCU server 120 according to subscription based systems and models. Client configuration information may be provided as part of-a catch-up request generated by the client configuration engine 275. Client configuration information may also be provided as part of an initial client-server negotiation when the DVR 150 comes on-line over data network 140 either automatically or as part of (or in addition to) an initial catch-up request.

Catch-up engine 275 may also provide information concerning the present status of the DVR 150 via another subsidiary engine referred to as a client status engine. Client status information provided by the client status engine via the catch-up engine 275 may include information concerning the status of content in hard drive storage 260. With this information, the DCU server 120 may operate to ensure that it delivers the appropriate amounts of catch-up content that may be processed or stored by the DVR 150 at any given time. As such, catch-up content may be provided in a series of faster-than-real-time transmissions wherein the beginning of some catch-up content is provided in an initial faster-than-real-time transmission followed by subsequent faster-than-real-time transmissions as provided for by the changing status of the hard drive storage 260 at DVR 150 and the availability of storage space in the same.

In some embodiments, the DVR 150-through hard drive controller 270—may delete certain content stored in hard drive 260 to make room for incoming catch-up content. This deletion may be automatic or the user may be informed that the hard drive 260 does not possess enough space to accept catch-up content absent deletion of pre-existing data, which may be part of a current transmission of content and/or previously recorded. Certain archived data may be overwritten during a catch-up operation subject to limitations on deletion of that data. For example, a user may designate certain data to be deleted as is necessary by the DVR 150 or to never delete the same without an affirmative user instruction.

DVR 150 may also comprise an auxiliary interface 280 such as a USB interface. Through auxiliary interface 280 (in this example, a USB interface), the DVR 150 may connect to, for example, an 802.11x network via a wireless USB adapter. Through the use of a wireless adapter, a user of the DVR 150 may be able to transfer content from one DVR to another via a LAN such as a home network or even a wide-area network such as the Internet. The wireless adapter, too, may allow for the user to remotely access and view content stored on their DVR 150 through, for example, a portable media device and/or system such as the Slingbox™ as manufactured by SlingMedia of San Mateo, Calif. The wireless adapter may further provide scheduling capabilities whereby a user may log-on to a communications portal offering scheduling functionality. In this way, a user may update recording preferences and/or settings without being physically present with their DVR 150 but instead over a communications network.

The USB interface may also be used for the introduction of portable or auxiliary memory devices. For example, a user may increase storage capacity of the DVR 150 through an auxiliary memory device. A user may also transport saved content (subject to various DRM controls) via a portable memory device such as a flash-based memory device. The user may also introduce a variety of other media devices such as a DVD- or CD-burner if these devices are not physically integrated into the DVR 200.

DVR 150 may also use other interface configurations with respect to auxiliary interface 280 to connect to various peripherals such as the aforementioned wireless adapter. For example, the auxiliary interface 280 of DVR 150 may be configured with a serial port for connection to an auxiliary peripheral device. The auxiliary interface 280 of DVR 150 may also include InfraRed or Bluetooth functionality. Certain of these interface configurations may also be utilized in conjunction or integrated with output port 290.

Output port 290 is configured to deliver content from the DVR 150 to a user's television or some other media device, such as a sound system or a portable media device such as an MP3 player or an iPod as manufactured by Apple Computer, Inc. of Cupertino, Calif. DVR 150 may connect to a television via composite video and audio cables whereby output port 290 would comprise the composite cable connectors. In another embodiment, output port 290 may be configured for the coupling of an RF coaxial cable from the DVR 200 to a display device or a Digital Visual Interface (DVI) or High-Definition Multimedia Interface (HDMI) connector in the case of high-definition content. Output port 290 may also comprise an S-Video Cable output. In some embodiments, more than one output port 290 may be provided such that DVR 150 may comprise one or more of the aforementioned output configurations. In some embodiments, a user may utilize the auxiliary interface 280 for the purpose of a network transmission or to connect to a portable media device via a USB. Various other output configurations may be implemented with regard to output port 290 subject to the particular configuration of the receiving display or media device.

Figure 3:
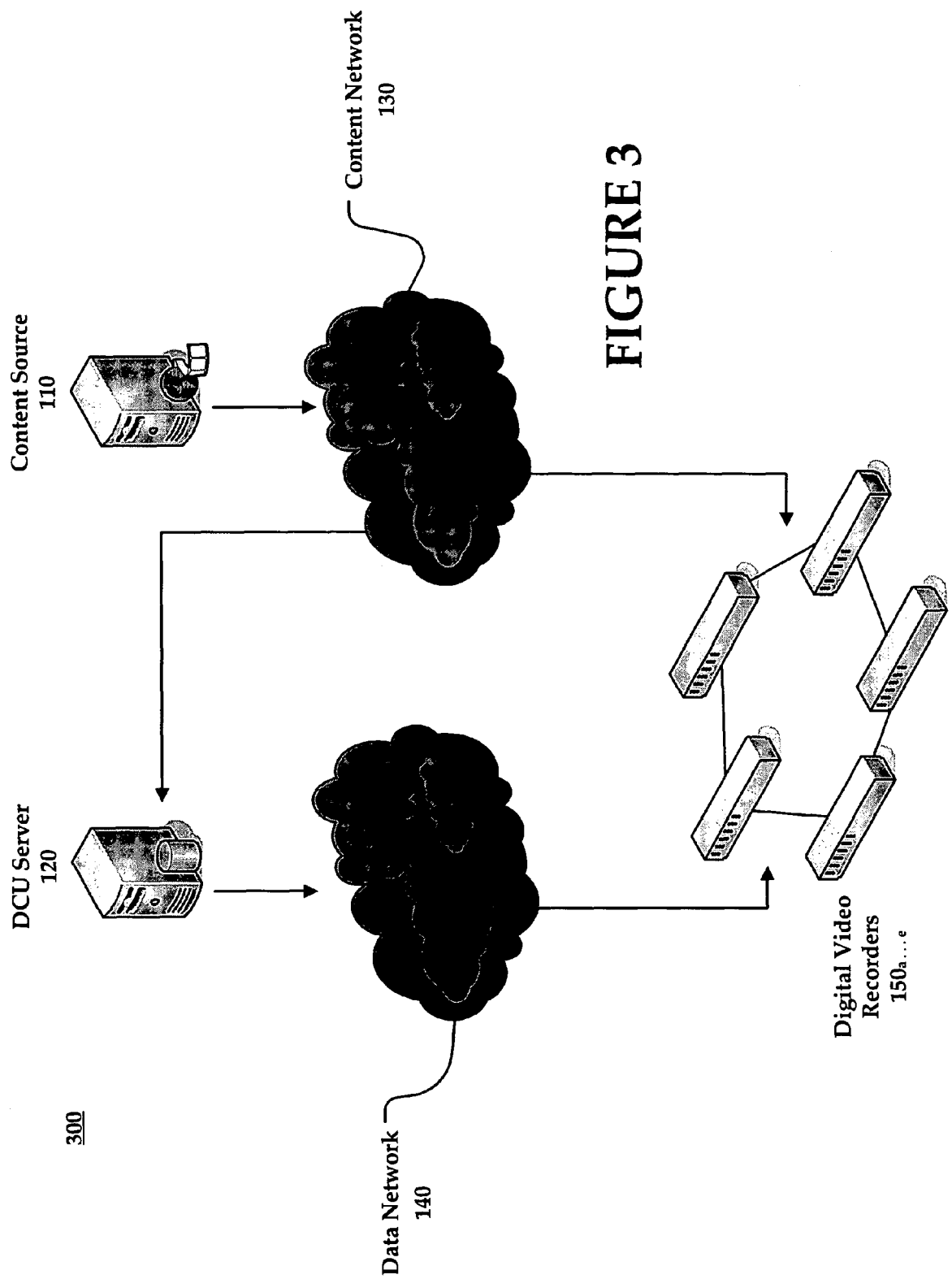
FIG. 3 illustrates a system architecture for digital content retrieval including a DCU server and a peer-to-peer network of DVRs, each with a data network interface, as may be implemented in an alternative embodiment of the present invention.

FIG. 3 illustrates a system architecture 300 for digital content retrieval including a DCU server 120 and a peer-to-peer network of DVRs (150a, 150b, 150c, 150d, 150e) with a data network interface as may be implemented in an alternative embodiment. Through the exemplary system 300 of FIG. 3, a user may request catch-up content from a peer DVR 150 instead of a dedicated DCU server 120.

In system architecture 300 of FIG. 3, a request for catch-up content from the catch-up engine 275 of any one particular DVR may be broadcast or multicast to other DVRs in the system 300. The DVRs 150 in the present embodiment may be further configured to receive a catch-up request via data network interface 210 and process this catch-up request in a manner similar to peer-to-peer and file-sharing networks. For example, a request is effectively made of multiple DVR peers asking 'who has a particular portion of content?' Thus, in this embodiment, each DVR 150 possesses functionality to respond to this query and deliver a particular portion of content to another DVR 150.

The peer-to-peer network implementation shown in FIG. 3 may be of use if particular content was recorded by one DVR 150 in the system architecture 300 but that particular DVR 150 did not to record the entire content transmission. Not having recorded the entire content transmission may not be recognized until after the regularly scheduled recording has been completed. For example, a content transmission may start early, late, or be rescheduled subject to various requirements of the content source 110. In such an event, the DCU server 120 may no longer have the particular content in memory as the content transmission has terminated and the DCU server 120 may have eliminated the content from memory to make room for new, incoming content. Thus, in this embodiment, an individual DVR 150 may query other DVRs 150 of the system architecture 300 and retrieve particular missing portions of content from hard drive storage 260 of a peer DVR 150 as if the peer DVR 150 were a dedicated DCU server 120. Due to the possibility for illegal sharing of content, various encryption and/or DRM requirements may be implemented with regard to the DVR 150 and/or the content shared between the DVRs 150.

Figure 4:
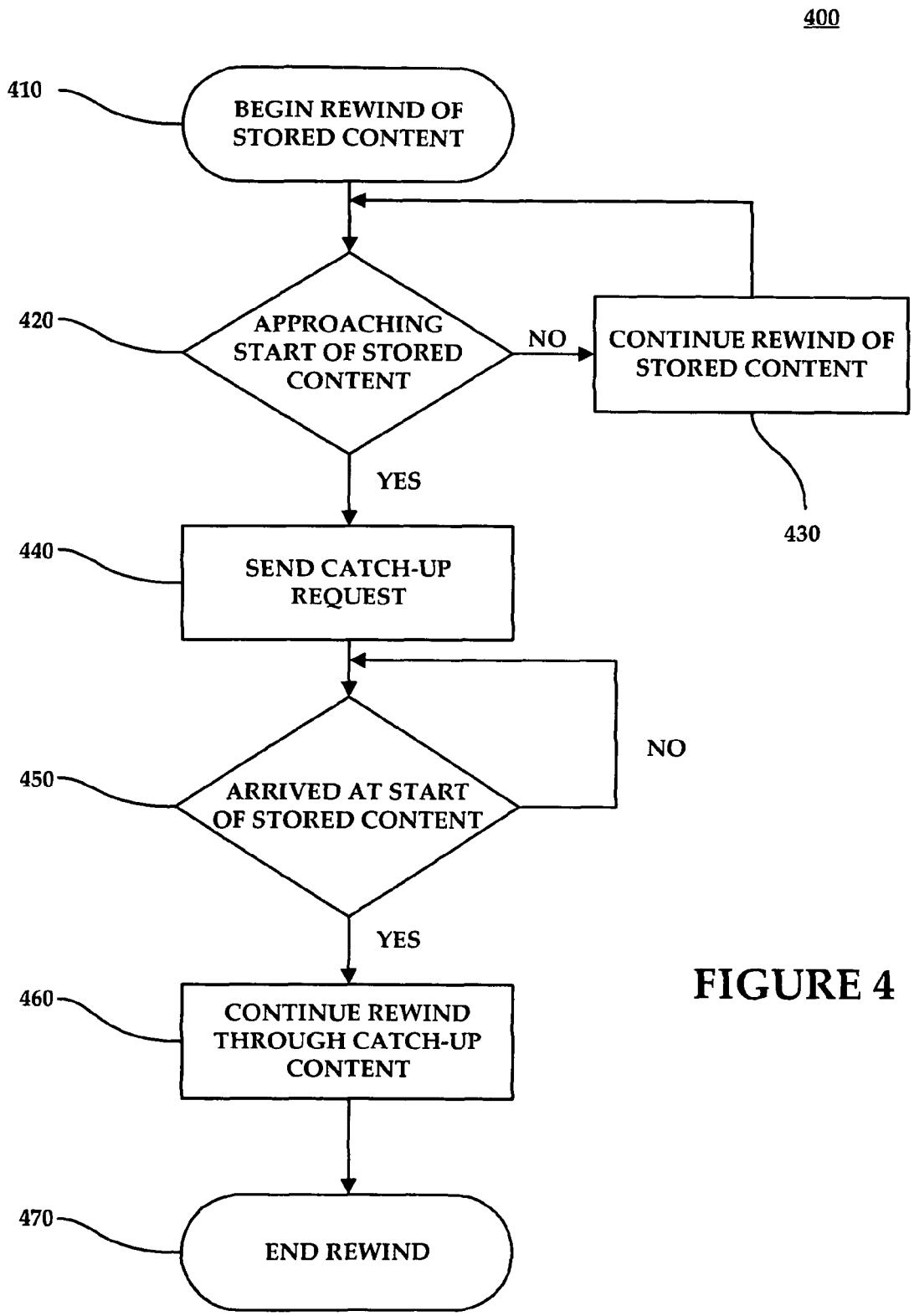
FIG. 4 illustrates an exemplary method for retrieving available digital catch-up content from a DCU server in accordance with one embodiment of the present invention.

FIG. 4 illustrates an exemplary method 400 for retrieving available catch-up content from a DCU server 120 in accordance with one embodiment. Through the method 400 of FIG. 4, a user need only rewind through local content on their DVR 150 until meeting or surpassing a threshold indicator representative of a need for catch-up content. A DCU server 120, in response to a catch-up request triggered by the threshold indicator, then sends the available, requested catch-up content to the user's DVR.

With respect to method 400, a user of a DVR or other recording device configured to store digital content may issue a rewind command. The user may issue this rewind command by manually pressing a rewind button on the DVR in a manner similar to pressing a rewind button on a VCR or other cassette tape based device. The issuance of the rewind command may also occur through a remote control device associated with the DVR. That device may transmit the related rewind command via InfraRed, Bluetooth, or some other communications medium and/or standard.

Alternatively, the user may be able to indicate the exact location the user wishes to rewind to in the content. This indication may occur through the use of scene identifiers, chapters, or other markers or pointers associated with the content as is known in the art. For example, a user may be able to identify through any variety of input control devices that the user wishes to rewind to two minutes from the present location in the content or two minutes from the commencement of the content.

Following issuance of the rewind command, the DVR receiving the rewind command—in step 410—begins to seek through content, for example, cached content stored in hard drive storage 260 as was described with reference to FIG. 2. The seeking, retrieval, and review of cached content from hard drive storage 260 may be visually and/or audibly perceptible in that the user may see and/or hear—albeit in reverse—the content that is being rewound in response to the rewind command. In some embodiments, the user may not see or hear the content being rewound).

In step 420, the hard drive controller 270 determines that the DVR is approaching the beginning of the cached content in hard drive storage device 260. That is, although the hard drive controller 270 is processing data, the data being processed (seeked) corresponds to the earliest temporal point of the stored content. The hard drive controller 270 may arrive at this determination through processing of various temporal pointers associated with the content.

For example, the hard drive storage device 260 of the DVR may be configured to store a maximum of thirty minutes of cached playback content as that content is represented by data in the hard drive storage device 260. Therefore, the earliest temporal point of stored digital content at any time may be designated as time (t)=−1800 (30 minutes×60 seconds). The hard drive controller 270 may comprise a threshold indicator, which indicates when to begin accessing remotely stored content over a network to address the possibility that the user may seek to rewind further than the temporary cache of content allows. That is, the user may wish to rewind back in time by 45 minutes (t=−2700) but only 30 minutes of cached content are available indicating the need for a catch-up request for catch-up content.

The threshold indicator may be associated with a particular pointer (e.g., t=−1600) to the content presently cached in hard drive storage 260. This threshold indicator may be a default setting by the DVR manufacturer such that the DVR always begins requesting catch-up content at a certain point in the rewind process. Alternatively, the threshold indicator may be programmable whereby the user of the DVR adjusts the point at which the DVR will send a catch-up request to a DCU server 120. The indicator may also be configured by a particular DCU server 120 provider, which may be able to derive intelligent determinations as to exactly when a transmission of catch-up content may best occur based on network conditions and a transmission rate of catch-up content over the network, which may further be related to the particular degree of compression previously applied to the catch-up content.

If the hard drive controller 270 determines that the user has not yet surpassed the threshold indicator with respect to cached content in the hard drive storage device 260 in step 420, the DVR may continue rewinding through content at step 430. This rewind process continues until the user meets or surpasses the threshold indicator in step 420. Alternatively (not shown in FIG. 4), the user may arrive at the particular point in the cached content stored in hard drive storage 260 such that the user terminates the rewind operation and begins viewing the cached content and catch-up functionality is not invoked.

In step 440 (the threshold indicator having been met or surpassed in step 420) a catch-up request is sent via catch-up engine 275 and CPU 250. The catch-up engine 275 will have been notified of the need for catch-up content by hard drive controller 270 with respect to the aforementioned threshold indicator having being met or surpassed. The catch-up request, as previously described, may include information concerning the particular content being requested such as a movie title and a temporal range of the same (i.e., what portion of the content is being requested). The DCU server 120 may begin delivering requested catch-up content in response to this request simultaneously with continued rewind of content at the DVR 150 by the user.

In step 450, the hard drive controller 270 determines whether the user has 'seeked' to the temporal beginning of the cached or recorded content with respect to data stored in the hard drive storage device 260 (i.e., the earliest start point of the content). If there remains further cached or recorded content that may be rewound, the user may continue rewinding from the hard drive storage 260 of DVR 150.

If the user has caused the DVR 150 to rewind to the beginning of the cached or recorded content in hard drive storage 260, the DVR 150 may then begin separately rewinding through content received at the DVR 150 via a faster-than-real-time transmission from the DCU server 120 at step 460. That received catch-up content may now reside in the hard drive storage 260. Rewind of the content (both cached and/or recorded in addition to the received catch-up content continues until the user reaches the temporal beginning of all the available content (originally stored content and received catch-up content) in step 470.

Figure 5:
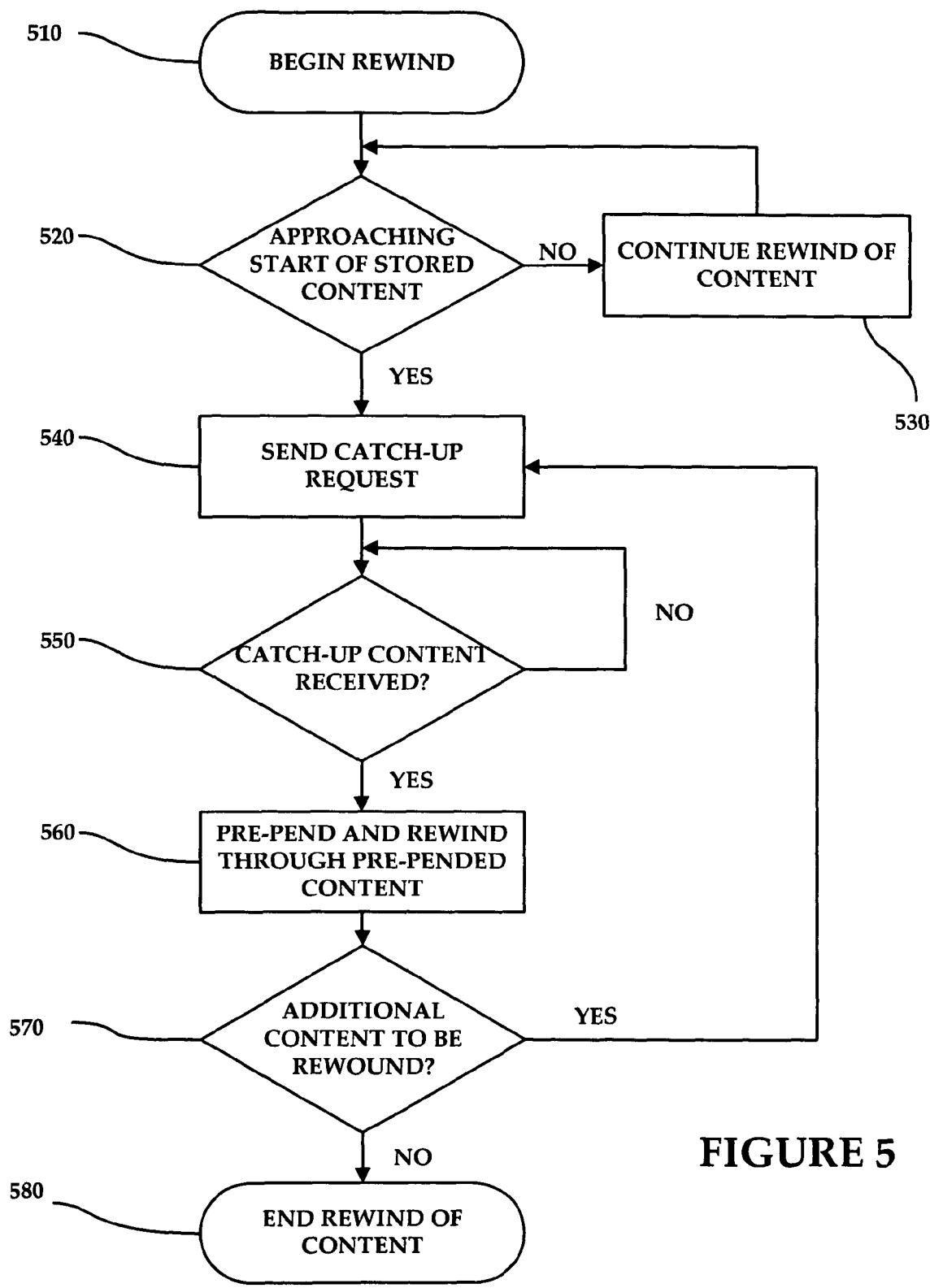
FIG. 5 illustrates an exemplary method for retrieving portions of 'as needed' digital catch-up content from a DCU server in accordance with one embodiment of the present invention.

FIG. 5 illustrates an exemplary method 500 for retrieving portions of catch-up content from DCU server 120 and pre-pending that content with content stored at the DVR 150 in accordance with an additional embodiment of the present invention. Through the method 500 of FIG. 5, a number of faster-than-real-time transmissions of content may occur on an 'as needed' basis with respect to catch-up content versus a singular transmission in the context of FIG. 4. Steps 510 through 540 are similar to steps 410 through 440 of FIG. 4. In step 550, however, the DVR 150 determines whether the content from DCU server 120 has been delivered to the DVR 150 through, for example, a faster-than-real-time transmission. If the catch-up content has not been received, the user continues rewinding through content at the DVR 150 until the user runs out of content from which to rewind or until the content arrives from the DCU server 120.

In step 560 and following arrival of the catch-up content from DCU server 120, that content is pre-pended to the content already present at the DVR 150 and stored in hard drive storage 260. This pre-pended content may be re-stored as recorded content in order to make available various memory resources for the temporary caching of current content arriving via input port 220. The user may then continue to rewind through the content, also in step 560.

If the user has reached the end of the content needed to be rewound (as determined in step 570), then the rewind process ends at step 580 and the next action as controlled by the user commences (e.g., playback of the content). Alternatively, if there is additional content to be rewound, the method 500 continues whereby the threshold indicator as to available rewind material is reset in light of the catch-up content having been pre-pended to the previously stored content. If the amount of content on the hard drive 260 falls below that new threshold indicator, a new catch-up request is sent to the DCU server 120 in step 540 and the method otherwise repeats as described above.

Through this particular method 500, once the catch-up content has been received, it is pre-pended to the content already stored at the DVR 150 (either cached or recorded). Playback or other interaction with this pre-pended content may then occur as if all the content had been initially recorded or cached at the DVR 150.

Figure 6:
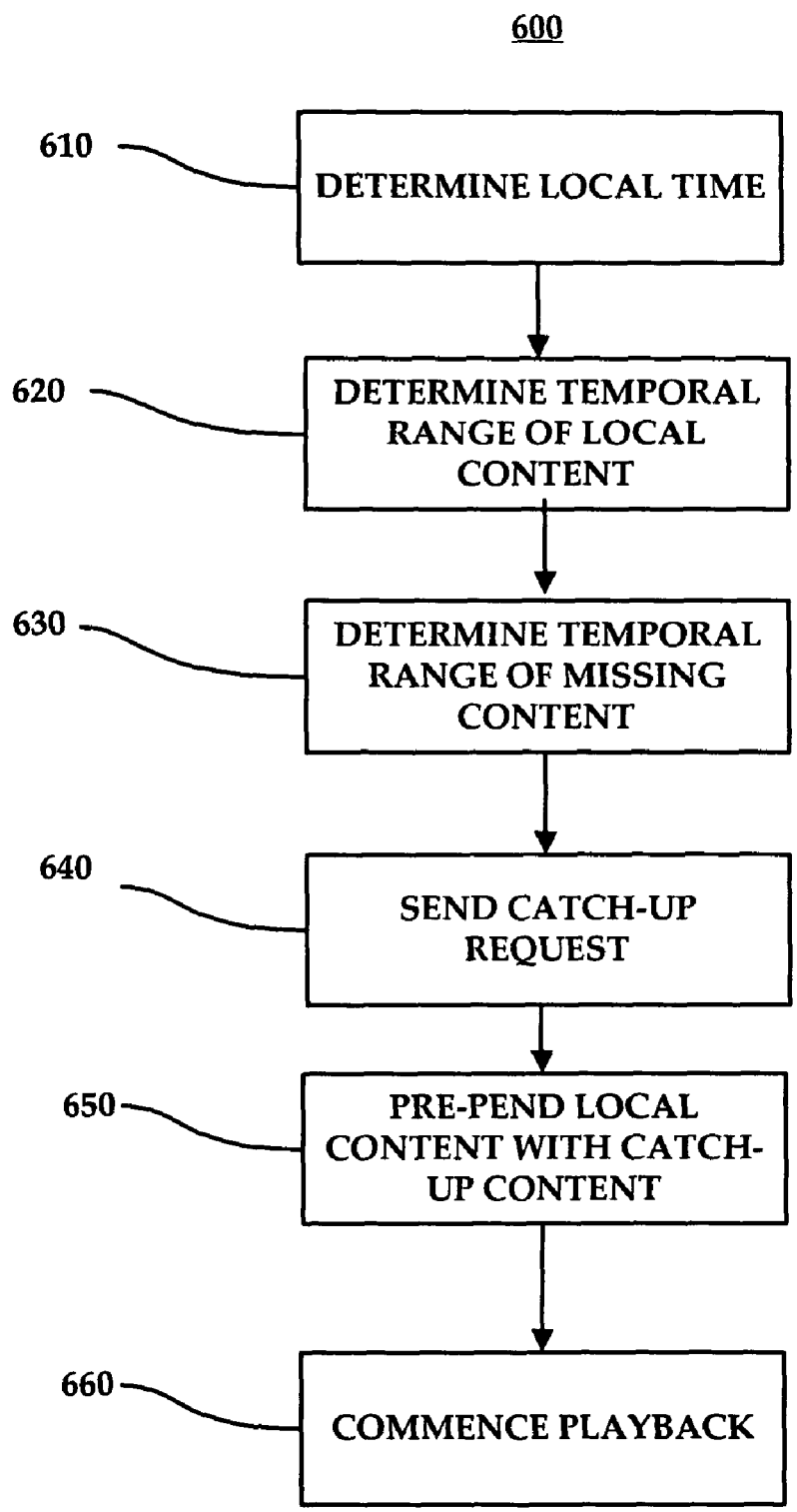
FIG. 6 illustrates an exemplary method for retrieving available digital catch-up content from a DCU server in accordance with an exemplary embodiment of the present invention.

FIG. 6 illustrates an exemplary method 600 for retrieving catch-up content from a DCU server 120 in accordance with one embodiment. Through the method 600 of FIG. 6, a user may invoke 'at once' catch-up functionality without having to rewind through content and meet or surpass a threshold indicator as is the case with FIGS. 4 and 5. This 'at once' functionality may be implemented through a single control button on a remote control device or DVR 150 wherein all calculations as to catch-up content are made and delivered 'at once' to a DCU server 120.

In step 610, the local time is determined (e.g., the time as indicated by an internal or networked clock for the DVR). In step 620, the temporal range of the content available at the DVR 150 (cached or recorded) and with respect to the presently playing content is identified. For example, if the DVR comprises a 30-minute current content cache and it is currently 8:40 pm as identified in step 610, then the temporal range of the available content in the DVR's memory cache goes back in time until 8:10 pm.

In step 630, the start time of the presently transmitted content is identified. This information may be identified from a programming schedule transmitted to the DVR over data network 140 or content network 130, a phone line, as part of an IP-based data transmission, or from metadata embedded in the content (e.g., a header or sideband transmission). Also in step 630, the time range missing from storage in the hard drive storage 260 (cached or recorded) with respect to the start-time of the present content is determined. In this case, the content is identified to have started at 8:00 pm thus 10 minutes of content (8:00 pm to 8:10 pm) is missing from storage at the DVR 150 in that only that content corresponding from 8:10 pm to 8:40 pm is presently cached.

In step 640, for example, a catch-up request is sent from the DVR 150 to DCU server 120 with a request for the missing 10 minutes of content. The DCU server 120 then addresses and sends the 10 minutes of content to the DVR 150 as indicated by the catch-up request in a faster-than-real-time transmission of content. Alternatively, the DCU server 120 may send catch-up content until the DVR 150 indicates that no more content is needed as may occur through exchanges of client status information. In step 650, the catch-up content may be pre-pended with the local content (in a manner similar to FIG. 5) and in step 660, playback can begin. As playback of the now pre-pended content (10 minutes of catch-up content and the pre-existing 30 minutes of local content) begins, the DVR 150 may continue recording a current content transmission from 8:40 pm onward (as is appropriate) and may allocate the appropriate portions of hard drive storage 260 for storage in accordance with hard drive controller 270.

In an alternate embodiment, in step 630, the user may manually identify a particular portion of content to be retrieved DCU server 120. For example, if the user knows that the first five minutes of a particular piece of content are introductory credits, the user may simply request that the content only be caught up from 8:05 pm onward through the use of a remote control or some other menu/interface device.

Various other functionalities may be introduced with respect to content provided by the DCU server 120. For example, DCU server 120 or a computing device coupled thereto may collect information concerning catch-up requests from particular users. In this way, content providers may build a more accurate profile about a particular user (or groups of users) associated with a particular DVR with respect to likes and dislikes as to certain programming or other provided content (e.g., commercials). That is, if a user is willing to take the time to seek catch-up content from the DCU server 120, this may be indicative that the content (or the subject matter thereof) is of a particular interest to the user such that they engage in the use of this catch-up functionality. To more accurately build a profile, certain programming may be classified in various respects (e.g., genre, actors, subject matter, etc.). In some embodiments, the user of the DVR may be able to deactivate the collection of viewing habits and catch-up request data or to make that data anonymous in the sense that the catch-up data is not associated with any particular user or device but instead indicates a general interest in the same by an anonymous member of the viewing public.

The catch-up functionality offered by the catch-up enabled DVR 150 and, specifically, the catch-up engine 275 and hard drive controller 270 may be provided to legacy model DVRs that possess a data network interface 210 or other means to access such data such as through an auxiliary device via auxiliary interface 280 or over a telephone line via an RJ-11 port. The catch-up engine 275 and related updated controller program code for the hard drive controller 270 may be introduced through one of these software updates and may accompany other data/software transmissions such as scheduling information or other DVR configuration data.

The DCU server 120 may also insert advertisements (e.g., banners, pop-ups, on-screen sponsorship logos, etc.) into catch-up content data as a means to help alleviate the costs of the DCU server 120 and its storage and subsequent delivery of content over a network. Notwithstanding, access to DCU server 120 may carry a usage fee that is billed to the user based on particular addressing information of their DVR 150 as is associated with an account comprising various billing information. Billing may be a monthly service fee, a per-use fee, for some other financial structure such as pay-for-premium catch-up content and the like.

Catch-up functionality may be possible without full-DVR functionality. For example, if the user has a set-top box with available memory to store content, the DCU server 120 may provide this content—presumably the entirety of the content (although it may be delivered in piecemeal faster-than-real-time transmissions depending on the available memory) to the user. Such a device may not, however, possess certain functionality concerning pause, fast forward, record, rewind as is commonly found in DVR 150 although the playback of content remains possible. In such an embodiment, the DCU server 120 may constantly stream or provide intermittent transmissions of faster-than-real-time content to the set-top box in order to ensure an uninterrupted playback experience.

While various embodiments have been described above, it should be understood that they have been presented by way of example only, and not limitation. Thus, the breadth and scope of any particular embodiment should not be limited by any of the above-described exemplary embodiments.

What is claimed is:

1. A method for retrieval of content of a given video program from a network storage device, comprising:
rewinding program content stored at a digital video recorder in response to a user initiated command;
identifying that the digital video recorder is approaching a threshold indicator, the threshold indicator associated with the beginning of the given video program content stored at the digital video recorder as a result of rewinding the content stored at the digital video recorder;
requesting additional content of the given video program from the network storage device in response to the threshold indicator, the additional content temporally preceding the given video program content stored at the digital video recorder and wherein the additional content is not presently stored at the digital video recorder, the request occurring over a data network;
receiving the additional content at the digital video recorder from the network storage device in response to the request for additional content, the additional content having been transmitted from the network storage device to the digital video recorder over the data network, while at least a portion of the temporally later content is being received from a content source separate from the network storage device and stored at the digital video recorder;
storing the additional content from the network storage device at the digital video recorder; and
rewinding the additional content received from the network storage device once the digital video recorder arrives at the beginning of the given video program content initially stored at the digital video recorder.

2. The method of claim 1, wherein the additional content is received over the data network at a faster-than-real-time rate such that a total transmission time of the additional content is less than the real-time playback of the additional content.

3. The method of claim 1, wherein the network storage device is a server configured to store content from one or more content sources.

4. The method of claim 3, wherein the network storage device is an other digital video recorder, the other digital video recorder comprising a memory storing the additional content requested by the digital video recorder.

5. The method of claim 3, wherein the server inserts one or more advertisements into the additional content transmitted to the digital video recorder.

6. The method of claim 3, wherein the server collects information about the digital video recorder requesting the additional content.

7. The method of claim 6, wherein the collected information is subsequently associated with an account of a user of the digital video recorder.

8. The method of claim 1, wherein the request for additional content comprises a start-time and an end-time of the additional content being requested from the network storage device.

9. The method of claim 1, wherein the request for additional content comprises client configuration information associated with the digital video recorder, the client configuration information reflecting at least one capability of the digital video recorder.

10. The method of claim 1, wherein the request for additional content comprises client status information associated with the digital video recorder, the client status information indicating the amount of memory available at the digital video recorder for storage of the requested additional content.

11. A method for retrieval of content of a given video program from a network storage device, comprising:
identifying a first portion of the given video program content presently available in a memory of a digital video recorder and received from a content source separate from the network storage device;
identifying a second portion of content of the given video program missing from the memory of the digital video recorder, wherein the content of the given video program missing from the memory of the digital video recorder temporally precedes the content of the given video program presently available in the memory of the digital video recorder;
sending a request across a data network to a network storage device for the missing portion of content; and
receiving at a faster-than-real-time rate transmission of the missing portion of content from the network storage device, the transmission occurring over the data network, the second portion of content being received at the digital video recorder while at least a portion of the first portion of the given video program content is being received at the digital video recorder.

12. The method of claim 11, further comprising:
pre-pending the missing portion of content received from the network storage device with the portion of content presently available in the memory of the digital video recorder; and
storing the pre-pended content in the memory of the digital video recorder.

13. The method of claim 12, further comprising:
receiving at a faster-than-real-time rate the second missing portion of content from the network storage device.

14. The method of claim 11, further comprising:
receiving the missing portion of given video program from the network storage device during real-time transmission and storage in the memory of the presently available portion of the given video program received from a separate content source.

15. A digital video recorder, comprising:
an input port configured to receive a first portion of content of a given video program from a content source, receipt of the first portion of content occurring in real-time;
a storage device separate from the content source and configured to store the first portion of content received from the content source;
a controller device configured to manage access to at least the stored first portion of content received from the content source;
a catch-up engine configured to request a second portion of content of the given video program from a server storing one or more portions of the content of the given video program, wherein the second portion of the content temporally precedes the first portion of content received and stored at the digital video recorder and wherein the second portion of the content is not presently stored at the digital video recorder; and
a data network interface configured to receive the second portion of content from the server while at least a portion of the first portion of content of the given video program is currently being received and stored at the digital video recorder.

16. The digital video recorder of claim 15, wherein the second portion of content received from the server is stored in the storage device.

17. The digital video recorder of claim 16, wherein the second portion of content received from the server is prepended with the stored first portion of content by the controller device.

18. The digital video recorder of claim 15, wherein the catch-up engine is further configured to provide information associated with the configuration of the digital video recorder to the server.

19. The digital video recorder of claim 15, wherein the catch-up engine is further configured to provide information associated with the status of the digital video recorder to the server.

20. The digital video recorder of claim 15, further comprising an analog-to-digital converter configured to convert the first portion of content received from the content source from an analog format to a digital format.

21. The digital video record of claim 20, wherein the input port and the analog-to-digital converter are integrated.

22. The digital video recorder of claim 15, further comprising a compression engine to compress the first portion of content received from the content source prior to its storage in the storage device.

23. A networked storage device, comprising:
an input port configured to receive content of a given video program directly from a content source separate from and coupled to the networked storage device, receipt of the content occurring in real-time;
memory configured to store content of the given video program received from the content source;
a controller device configured to manage access to the content stored in the memory; and
an output port configured to transmit over a data network one or more first portions of the content of the given video program stored in the storage device to a digital video recorder requesting the one or more portions of content stored in the memory, wherein the one or more portions of requested content temporally precede a second portion of content of the given video program already present at the requesting digital video recorder and wherein the one or more first portions of requested content are not presently stored at the requesting digital video recorder;
the networked storage device configured to transmit the one or more first portions of content of the given video program while at least a portion of the second portion of content of the given video program is currently being transmitted to the requesting digital video recorder.

24. The networked storage device of claim 23, wherein the one or more portions of content are transmitted at a faster-than-real time rate.

25. The networked storage device of claim 23, further comprising a processor configured to process configuration information reflecting at least one capability of the digital video recorder.

26. The network storage device of claim 23, further comprising a processor configured to process client status information associated with the digital video recorder, the client status information indicating the amount of memory available at the digital video recorder for storage of the requested one or more portions of the content.

27. The networked storage device of claim 23, further comprising a network optimization engine configured to allocate bandwidth between the networked storage device and the digital video recorder requesting the one or more portions of the content stored by the storage device.

28. The networked storage device of claim 27, wherein the network optimization engine is further configured to cause the one or portions of content transmitted to the digital video recorder to be transmitted at one or more encoded bit rates.

29. The networked storage device of claim 27, wherein the network optimization engine is further configured to cause the one or more portions of content transmitted to the digital video recorder to be transmitted in one or more encoding formats.

30. A digital video recorder for use in a system having a content source configured to transmit content of a given video program in real-time over a content network and a server separate from and coupled-to the content network and to a data network, wherein
the digital video recorder is configured to be coupled to the content network and the data network;
the digital video recorder is configured to receive and store a first portion of the real-time transmission of the given program over the content network;
the digital video recorder is further configured to request from the server a second portion of the given video program transmitted over the content network, wherein the second portion of the given video program temporally precedes the first portion of the real-time content of the given video program received and stored at the digital video recorder and wherein the second portion of the given video program is not presently stored at the digital video recorder; and
the digital video recorder is further configured to receive the second portion of the given video program over the data network from the server while at least a portion of the first portion is currently being received from the content source and stored at the digital video recorder.

31. The digital video recorder of claim 30; wherein the digital video recorder provides the server with client configuration information associated with the digital video recorder, the client configuration information reflecting at least one capability of the digital video recorder.

32. The digital video recorder of claim 30, wherein the digital video recorder provides the server with client status information associated with the digital video recorder, the client status information indicating the amount of memory available at the digital video recorder for storage of the second portion of the content requested from the server by the digital video recorder.

33. The digital video recorder of claim 30, wherein:
the digital video recorder is configured to receive the second portion of the given video program at a faster-than-real-time rate such that a total transmission time of the second portion of the given video program is less than the real-time playback of the second portion of the given video program.

* * * * *